April 17, 1945.　　　R. T. WHITNEY　　　2,374,061
BRAKE CONTROL VALVE DEVICE
Filed Oct. 13, 1943
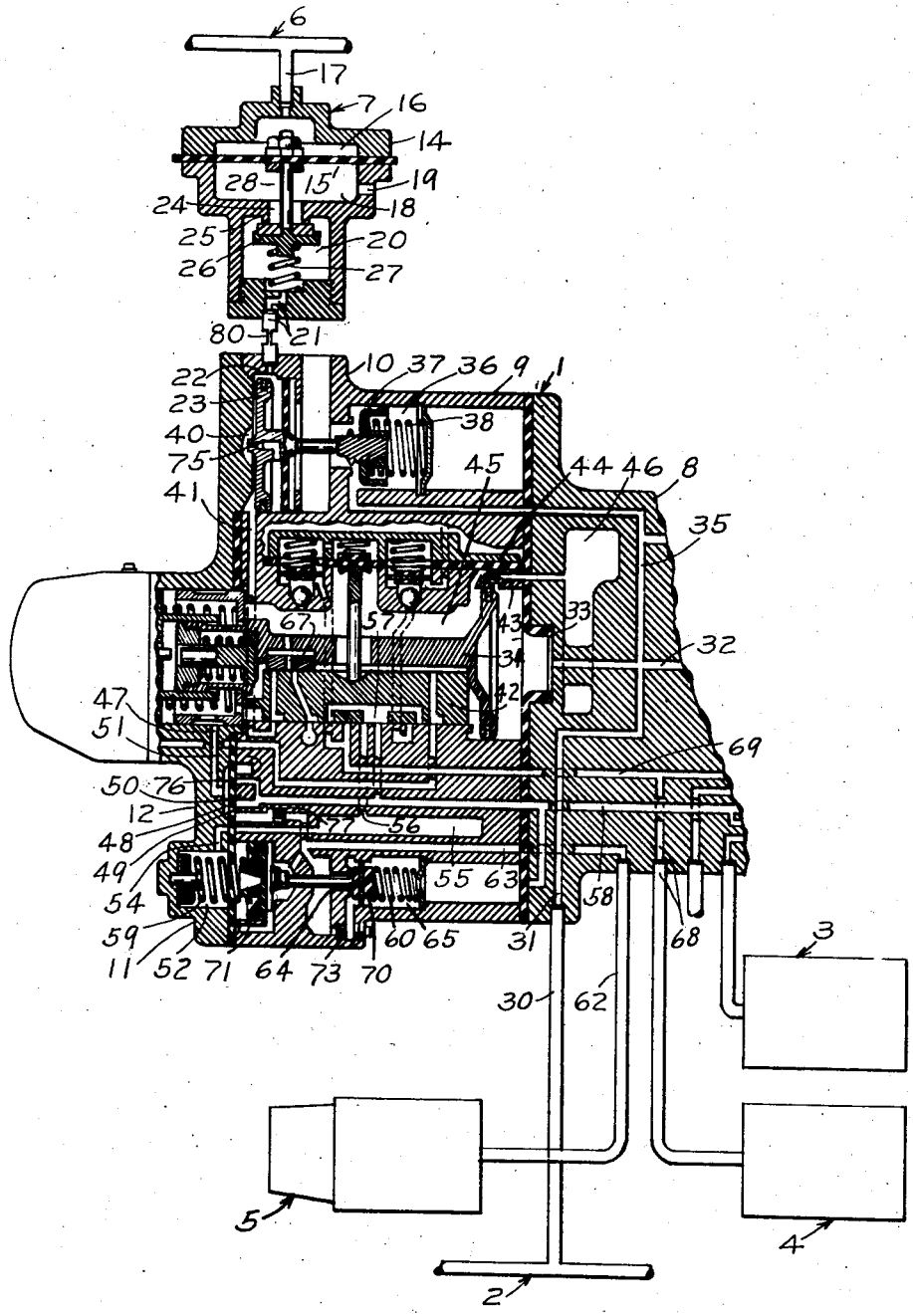
INVENTOR
RALPH T. WHITNEY
BY
ATTORNEY Patented Apr. 17, 1945

2,374,061

UNITED STATES PATENT OFFICE 2,374,061

BRAKE CONTROL VALVE DEVICE

Ralph T. Whitney, Irwin, Pa., assignor to The Westinghouse Air Brake Company, Wilmerding, Pa., a corporation of Pennsylvania Application October 13, 1943, Serial No. 506,041

4 Claims. (Cl. 303—23)

This invention relates to fluid pressure brake equipment for controlling the application and release of the brakes on a vehicle and more particularly to a brake equipment of the "AB" type such as is disclosed in Patent No. 2,031,213, issued to Clyde C. Farmer on February 18, 1936.

The railroad companies have provided several very important classes of train service, such for instance as passenger, express, and freight, and have designated and equipped certain cars for the particular service in which they are to be employed. It is well known that passenger trains are comparatively short and are operated on high speed schedules, that express trains are longer than passenger trains and are operated on speed schedules approaching passenger train schedules, and that freight trains are generally much longer than express trains and, with the exception of fast freight service, operate on slower speed schedules.

Modern transportation requirements are such that cars equipped for one class of service may also be employed in the other classes of service, so that, under normal train operating conditions, it is not uncommon for a train in express service to be made up wholly of freight cars.

The "AB" brake equipment was designed for controlling the brakes on long freight trains. While this type of brake equipment is generally suitable for passenger, express or fast freight train service it has been found that certain operating characteristics thereof can be improved to better adapt it for such service. It is well known by those skilled in the fluid pressure brake art that brake equipment of this type includes an emergency portion which operates upon an emergency reduction in brake pipe pressure to supply fluid under pressure from a quick action chamber to actuate a brake pipe vent valve device for effecting a sudden, local, emergency venting of fluid under pressure from the brake pipe. The fluid under pressure is then gradually released from the quick action chamber through a choked passage to permit closure of the vent valve after a period of time sufficient to insure complete venting of fluid pressure from the long brake pipe on such trains. After closure of these vent valves through the train the brakes may be released by recharging the brake pipe on the train.

At the present time there are many cars in service equipped with K type equipment which was standard before the "AB" equipment. Long freight trains may therefore comprise some cars equipped with the "K" equipment mixed in with cars provided with the "AB" equipment. In the "K" equipment a complete venting of fluid under pressure from the brake pipe in effecting an emergency application of the brakes is not provided for as in the "AB" equipment. In order to insure said complete venting in long freight trains it is therefore necessary that the vent valves of the "AB" equipment be held open, as above described, for a period of time which is longer than would otherwise be necessary and this period of time is excessive and undesirable for shorter trains such as fast freight or express, in that at times it might result in an undue delay in getting such trains under way again following an emergency application of the brakes.

In a long train there is a relatively great amount of slack between the cars of the train which must be gathered gently at the time an emergency application of the brakes is effected in order to prevent the development of damaging shocks between cars in the train. In order to prevent the development of such shocks the "AB" equipment is provided with a brake cylinder build-up control mechanism. This mechanism, upon an emergency reduction in brake pipe pressure, operates initially to provide a limited inshot of fluid pressure to the brake cylinder on the cars in a train to start the slack in the train to gather. The mechanism then operates to supply fluid under pressure to the brake cylinder at a relatively slow rate to insure the gentle gathering of the slack, and finally, said mechanism operates to provide a more rapid flow of fluid under pressure to the brake cylinder to the full emergency degree to bring the train to a stop.

As hereinbefore mentioned cars equipped with the "AB" brake equipment are often required to operate in relatively short and high speed freight, express or passenger service in which slack is not a limiting factor in emergency, so that an emergency application of the brakes may be effected on such trains without the delay required in long freight train service, as it is desirable to bring any train to a stop as rapidly as possible in case of emergency.

One object of the invention is therefore the provision of an improved and relatively simple means arranged to be associated with the "AB" brake equipment, which means is automatically adjustable or conditionable, in accordance with the class of service in which the brake equipment is being used to condition the equipment to provide the desired operating characteristics for that service.

Short high speed freight, express and passenger trains are each provided with a signal pipe which extends throughout the length of the train and which is normally charged with fluid under pressure to provide for the transmission of signals from one location in the train to another. Long freight trains are not so equipped.

Another object of the invention is to provide means associated with the "AB" brake equipment which is arranged to be controlled from a signal pipe and to be adjusted when the signal pipe is void of fluid under pressure, as in long freight train service, to delay closure of the vent valve of the "AB" brake equipment and to render the brake cylinder build-up control mechanism of the "AB" brake equipment effective to delay an emergency application of the brakes as required in such service, and which is adjustable or conditionable by fluid pressure acting in the signal pipe in short high speed train service to eliminate the delay in closing the vent valve and to render said mechanism ineffective to provide the delayed build-up in brake cylinder pressure so as to provide for obtaining a relatively rapid emergency application of the brakes.

Other objects and advantages will be apparent from the following more detailed description of the invention.

In the accompanying drawing the single figure is a diagrammatic view, largely in section, of a fluid pressure brake equipment embodying the invention.

Description

As shown in the drawing the brake equipment may comprise a brake controlling valve device 1, a brake pipe 2, an auxiliary reservoir 3, an emergency reservoir 4, a brake cylinder 5, a signal pipe 6 and an auxiliary vent valve device 7.

The brake controlling valve device 1 comprises a pipe bracket portion 8, an emergency portion 9 and the usual service portion (not shown). The emergency portion 9 embodies a quick action vent valve device 10, and an emergency brake cylinder build-up control valve mechanism comprising an emergency inshot valve device 11 and a timing valve device 12. This brake controlling valve device may be identical with that shown, described and claimed in the aforementioned patent, and since it operates to perform the usual well known function of the "AB" valve it is deemed unnecessary to show and describe the device in detail. However, in order to illustrate certain connections hereinafter described in connection with the operation of the equipment embodying the invention certain parts have been shown in section.

The auxiliary vent valve device 7 may comprise a two piece casing 14 having clamped therebetween a flexible diaphragm 15. At one side of the diaphragm 15 there is a chamber 16 which is in constant open communication with the signal pipe 6 by way of a pipe and passage 17. At the opposite side of the diaphragm 15 there is a chamber 18 which is in constant open communication with the atmosphere by way of a passage 19.

The casing 14 is also provided with a chamber 20 which is in the present embodiment of the invention connected by way of a passage and pipe 21 to the usual leakage groove 22 which is provided around the vent valve piston 23 in the vent valve portion 10 of the brake controlling valve device for a reason fully described in the aforementioned patent. The chamber 20 is also connected to the chamber 18 by way of a central passage 24. Surrounding passage 24 and extending into chamber 20 is an annular valve seat 25.

Mounted in chamber 20 is a valve 26 which is yieldably urged into seating engagement with the valve seat 25 by means of a spring 27.

The valve 26 is provided with a stem 28 which extends through the central passage 24 and is operatively connected at its end to the diaphragm 15 in any suitable manner.

Long train freight service

If a car provided with the present equipment is coupled into a long freight train on which, as is well known, there is no need of a signal pipe, the signal pipe 6 on the car will be devoid of fluid under pressure and chamber 16 at the upper side of diaphragm 15 in the auxiliary vent valve device 7 will therefore be open to the atmosphere. Under these conditions spring 27 will maintain valve 26 seated against the valve seat 25, as shown. With the valve 26 thus maintained closed the brake equipment on the car will then operate to control the car brakes in harmony with the control of brakes on all other cars in a long freight train in the same manner as described in the aforementioned Farmer patent, and which will now be briefly described.

To initially charge the brake equipment fluid under pressure is supplied to the brake pipe 2 in the usual manner and flows therefrom through a branch pipe 30, passage 31 and connected passage 32 to a piston chamber 33 disposed at one side of the usual emergency piston 34 in the emergency portion 9, and also flows from passage 32 through a connected passage 35 to a chamber 36 in the quick action vent valve portion 10. As shown the chamber 36 contains the usual vent valve 37 which is normally maintained seated by the action of a spring 38. As fully described in the aforementioned patent, the operation of the valve 37 is controlled by the usual vent valve piston 23 which is contained in a piston chamber 40 connected through a passage 41 to the seat for the usual emergency main slide valve 42.

With the operating parts of the emergency portion 9 in their normal release position, as shown in the drawing, fluid under pressure supplied to the piston chamber 33 flows through a restricted charging port 43 to a passage 44 and from thence flows in one direction to the usual emergency valve chamber 45 at the opposite side of the emergency piston 34 and in the opposite direction to a quick action chamber 46 provided in the pipe bracket 8. From valve chamber 45 fluid under pressure flows through a passage 47 to diaphragm chamber 48 of the usual timing valve device, the pressure of fluid in chamber 48 acting on the diaphragm 49 to maintain the timing valve 50 seated on seat rib 51. With the usual emergency main slide valve 42 in release position, the piston chamber 52 of the usual inshot valve device is connected to the atmosphere through the usual circuit including a passage 54, a chamber 55, a passage 56, a cavity 57 in the slide valve 42 and the usual application and release passage 58 leading to the atmosphere through the usual exhaust circuit in the service portion (not shown) of the brake controlling valve device. Even though the chamber 52 is thus connected to the atmosphere the spring 59 acts to maintain the inshot valve 70 open against the opposing pressure of the spring 60.

Fluid under pressure supplied to passage 32 also flows to the service portion (not shown) of the equipment. The service portion of the equipment, as fully described in the above mentioned patent and well known by those skilled in the fluid pressure brake art, is adapted to operate upon an increase in pressure in brake pipe 2 to establish communication through which fluid under pressure is supplied to the auxiliary and emergency reservoirs 3 and 4, respectively, for charging same, and to connect the application and release passage 58 with the atmosphere. It will be understood that with passage 58 connected to the atmosphere the brake cylinder 5 will therefore be connected to the atmosphere in the usual manner by way of a pipe 62, a passage 63, a passage 64 in the inshot valve device, inshot valve chamber 65 and passage 58.

From the foregoing description of the charging of the equipment, it will be seen that the brakes are released and that the equipment is fully charged to its normal pressure with fluid.

When it is desired to effect an emergency application of the brakes, an emergency reduction in the brake pipe pressure is effected in the usual well known manner which causes the several parts of the service portion (not shown) and the emergency portion 9 to move to their emergency position.

With the operating parts of the service portion (not shown) in their emergency position, fluid under pressure flows from the auxiliary reservoir 3 to the inshot valve chamber 65 by way of passage 58 in the usual manner. With the emergency piston 34 and associated slide valves 42 and 67 in emergency position, fluid under pressure flows from the emergency reservoir 4 to the inshot valve chamber 65. The communication from the emergency reservoir is made in the usual manner by way of a pipe and passage 68, a passage 69, cavity 57 in the emergency slide valve 42 and passage 58.

Fluid under pressure thus supplied to inshot valve chamber 65 flows past inshot valve 70 through passage 64, passage 63 and pipe 62 to the brake cylinder 5. When the brake cylinder pressure has been increased sufficiently to cause the usual brake shoes to engage the wheels so as to start the slack in the train to gather or close, the piston 71 of the inshot valve device will be caused to move toward the left against the opposing pressure of the spring 59 and as a result of such movement the spring 60 causes the inshot valve 70 to seat and cut off communication from the valve chamber 65 to the passage 58 by way of the passage 64. With the passage 64 closed, fluid under pressure flows from valve chamber 65 to the brake cylinder by way of a restricted passage 73, so that the flow of fluid from valve chamber 65 to passage 58 and to the brake cyliner is now governed according to the flow area of the restricted passage 73.

With the emergency slide valve 42 in emergency position fluid under pressure flows from the emergency valve chamber 45 and connected quick action chamber 46 through passage 41 to the quick action piston chamber 40 causing piston 23 to move inwardly and unseat the vent valve 37 against the opposing action of spring 38. With the vent valve 37 unseated, fluid under pressure is rapidly vented from the brake pipe to the atmosphere by way of pipe 30, passages 31 and 35, chamber 36 and past the open vent valve 37. The resultant sudden reduction in brake pipe pressure acts to cause emergency operation of the brake equipment on the next adjacent car in the train for serially propagating quick action throughout the length of the train.

Fluid under pressure supplied to the quick action piston chamber 40 flows through the usual flow restricted port 75 in the piston 23 to the atmosphere, thus the pressure of fluid in said chamber and consequently in connected valve chamber 45 and quick action chamber 46 is gradually reduced to the atmosphere. Now when the increasing brake cylinder pressure present in chamber 76 of the timing valve device becomes slightly greater than the reducing quick action chamber pressure present in chamber 48, the flexible diaphragm 49 will flex outwardly and permit the timing valve 50 to unseat. With timing valve 50 unseated, fluid under pressure flows from the passage 58 through choke 77 to the brake cylinder passage 63 in addition to the supply through the restricted port 73 to accelerate the rate of increase in brake cylinder pressure over that which would be obtained by the flow of fluid through the restricted passage 73 only.

When, in effecting an emergency application of the brakes, the pressure of fluid in the emergency valve chamber 45 and quick action chamber 46 is sufficiently reduced through the choked port 75 in the vent valve piston 23, the spring 38 acting on the vent valve 37 will seat said valve and return the piston 23 to its normal position in which it is shown to provide for recharging of the brake equipment for effecting a release of the brakes after an emergency application, wherever such is desired. The volume of the valve chamber 45 and quick action chamber 46 are so related to the venting capacity of port 75 in the vent valve piston however that the vent valve 37 will be held open for a sufficient period of time to insure complete venting of all fluid from the brake pipe 2 in long slow speed freight service, to thereby insure the effecting of an emergency application of the brakes throughout the length of the train.

As fully described in the aforementioned Farmer patent the leakage groove 22 around the vent valve piston 23 is provided to permit the escape of any fluid under pressure remaining in the vent valve chamber 40 and connected valve and quick action chambers 45 and 46, respectively, upon movement of the vent valve piston 23 to its normal position before a release of the brakes is effected. Upon movement of the piston to its vent valve opening position this leakage groove is closed so that the only escape of fluid under pressure from the vent valve chamber 40 is by way of the choked port 75.

From the foregoing it will be understood that when a car equipped with a fluid pressure brake equipment embodying the invention is in long train freight service the chamber 16 in the auxiliary vent valve device 7 is devoid of fluid under pressure and that the spring 27 maintains the valve 26 seated so that this device does not change or modify any of the usual operating characteristics of the "AB" brake equipment even though the chamber 20 is in communication with the piston chamber 60.

*Short train high speed service*

When a car equipped with brake equipment embodying the present invention is coupled into a high speed freight, express, or passenger train, the charging of the signal pipe on the train will provide fluid under pressure in chamber 16 of the auxiliary vent valve device 7. Fluid under pressure in chamber 16 and acting on the diaphragm 15 will deflect same downwardly and cause the attached stem 28 and valve 26 to move in the same direction. As the valve 26 moves downwardly it moves out of engagement with its seat 25 and said valve will remain in this unseated condition so long as the signal pipe 6 is charged with fluid under pressure, that is to say, during all normal train operations. The unseating of valve 26 establishes a communication from chamber 20 to the atmosphere past unseated valve 26, chamber 18 and passage 19.

Now when an emergency application of the brakes is effected the vent valve piston 23 moves to its valve opening position in which the piston is in sealing engagement with the adjacent gasket. At substantially the same time the packing ring of the piston clears the port to which the pipe 21 is connected and closes the leakage groove. Fluid under pressure is now vented from vent valve piston chamber 40 and connected valve chamber 45 and quick action chamber 46 to the atmosphere by way of pipe and passage 21 containing a choke 80, chamber 20, past unseated valve 26, passage 24, chamber 18 and passage 19, as well as by way of choked port 75 in the vent valve piston 23, to thereby provide for quicker closing of the vent valve 37 than would be the case if the port 75 alone controlled the rate of flow of fluid. By reason of this arrangement a quicker release of the brakes after an emergency application is provided for than is obtainable on long freight trains.

From the foregoing description of the operation of the equipment in connection with long train service it will be understood that as the pressure of fluid in the quick action chamber 46 is reduced in effecting an emergency application of the brakes, the pressure of fluid in the connected chamber 48 of the timing valve device 12 is also reduced. In short train service where the auxiliary vent valve device 7 is operative to effect a more rapid blow down of the quick action chamber pressure acting in the timing valve chamber 48, it will be apparent that a lower brake cylinder pressure in chamber 76 and a shorter interval of time will be required to cause the diaphragm 48 to flex outwardly and permit the timing valve 50 to unseat than is required when the auxiliary vent valve device 7 is maintained inoperative and as a result a faster build-up in brake cylinder pressure will be effected than is obtainable on a long freight train where the rate of reduction in the pressure of fluid in chamber 48 is under the control of the choked port 75 only.

From the foregoing it will be understood that when a car equipped with a fluid pressure brake equipment embodying the invention is in fast freight, express or passenger service, i. e., short train service, the auxiliary vent valve 7 will function to effect a decrease in the blow down time of the quick action chamber pressure in chamber 48 and as a result will effect a more rapid increase in brake cylinder pressure when an emergency application of the brakes is effected. It will therefore be understood that the auxiliary vent valve device 7 will operate automatically to condition the "AB" type of brake equipment to meet the different requirements for either long slow speed freight service or fast speed short train service. For example, in the present standard "AB" brake equipment as now employed in long train service, the blow down time of the quick action chamber is approximately 70 seconds and the brake cylinder build-up time is about 10 seconds. In short train service in order to harmonize the braking action of the "AB" equipment with the brake equipments specifically designed for short train service it has been found desirable to decrease the blow down time of the quick action chamber to about 17 seconds and to decrease the brake cylinder build-up time. According to the invention this is accomplished by means of the auxiliary vent valve device 7 with but a slight change in the "AB" equipment, which change consists in the addition of the port to which the pipe 21 is connected.

Having now described my invention, what I claim as new and desire to secure by Letters Patent, is:

1. In a fluid pressure brake equipment of the type having a brake pipe normally charged with fluid under pressure, a brake pipe vent valve device comprising a normally closed vent valve, a chamber normally at atmospheric pressure and to which fluid under pressure is supplied in effecting an emergency application of the brakes, and a piston subject to the pressure of fluid supplied to said chamber for opening said valve to vent fluid under pressure from the brake pipe, and a restricted passage through which fluid under pressure is vented from said chamber, in combination, a signal pipe normally charged with fluid under pressure in a certain class of train service and normally devoid of fluid under pressure in a different class of train service, a communication established as an incident to the opening of said brake pipe vent valve through which fluid under pressure may be additionally vented from said chamber, valve means controlled by signal pipe pressure and operative to render said communication either effective or ineffective to vent fluid under pressure from said chamber, said valve means closing said communication when the signal pipe is devoid of fluid under pressure and being operative by the pressure of fluid in said signal pipe to open said communication.

2. In a fluid pressure brake equipment of the type having a brake pipe normally charged with fluid under pressure, a brake pipe vent valve device comprising a normally closed vent valve, a chamber normally at atmospheric pressure and to which fluid under pressure is supplied in effecting an emergency application of the brakes, and a piston subject to the pressure of fluid supplied to said chamber for opening said valve to vent fluid under pressure from the brake pipe, and a restricted passage through which fluid under pressure is vented from said chamber, in combination, a signal pipe normally charged with fluid under pressure in a certain class of train service and normally devoid of fluid under pressure in a different class of train service, a communication established by said piston upon operation of the piston to open said valve through which fluid under pressure may be additionally vented from said chamber, valve means controlled by signal pipe pressure and operative in response to a certain degree of signal pipe pressure to render said communication effective to vent fluid under pressure from said chamber and operative in response to a lower degree in signal pipe pressure to render said communication ineffective.

3. In a fluid pressure brake equipment of the type having a brake pipe normally charged with fluid under pressure, a brake pipe vent valve device comprising a normally closed vent valve, a chamber normally at atmospheric pressure and to which fluid under pressure is supplied in effecting an emergency application of the brakes, and a piston subject to the pressure of fluid supplied to said chamber for opening said valve to vent fluid under pressure from the brake pipe, and a restricted passage through which fluid under pressure is vented from said chamber, in combination, a signal pipe normally charged with fluid under pressure in a certain class of train service and normally devoid of fluid under pressure in a different class of train service, a communication established by said piston upon operation of the piston to open said valve through which fluid under pressure may be additionally vented from said chamber, a valve interposed in said communication having one position for opening the communication and another position for closing the communication, and means controlled by signal pipe pressure for controlling said valve, said means being operative to actuate said valve to said one position when said signal pipe is charged with fluid under pressure and to said other position when said signal pipe is devoid of fluid under pressure.

4. In a fluid pressure brake equipment of the type having a brake pipe normally charged with fluid under pressure, a brake pipe vent valve device comprising a normally closed vent valve, a chamber normally at atmospheric pressure and to which fluid under pressure is supplied in effecting an emergency application of the brakes, and a piston subject to the pressure of fluid supplied to said chamber for opening said valve to vent fluid under pressure from the brake pipe, and a restricted passage through which fluid under pressure is vented from said chamber, in combination, a signal pipe normally charged with fluid under pressure in a certain class of train service and normally devoid of fluid under pressure in a different class of train service, a communication established by said piston upon operation of the piston to open said valve through which fluid under pressure may be additionally vented from said chamber, a valve interposed in said communication having one position for opening the communication and another position for closing the communication, a movable abutment operative in response to signal pipe pressure when said signal pipe is charged with fluid under pressure for actuating said valve to said one position, and spring means operative when said signal pipe is vented for actuating said valve to said other position.

RALPH T. WHITNEY.